United States Patent [19]

Tomlin et al.

[11] Patent Number: 4,750,810

[45] Date of Patent: Jun. 14, 1988

[54] CAMERA OPTICS FOR PRODUCING A COMPOSITE IMAGE FROM TWO SCENES

[75] Inventors: Charles G. Tomlin, Ipswich; Richard Bingham, London, both of England

[73] Assignee: British Telecommunications plc, London, United Kingdom

[21] Appl. No.: 927,862

[22] Filed: Nov. 7, 1986

[30] Foreign Application Priority Data

Nov. 8, 1985 [GB] United Kingdom ................. 8527665

[51] Int. Cl.[4] ...................... G02B 27/10; G02B 17/14; G02B 5/04
[52] U.S. Cl. .................................. 350/171; 350/286; 358/87; 354/110; 352/65
[58] Field of Search ............... 350/169, 170, 171, 174, 350/286, 287, 137, 138, 130, 131, 133, 512–517, 542, 447; 358/87, 225, 226, 250; 352/93; 354/110, 112, 117, 114, 120, 122

[56] References Cited

U.S. PATENT DOCUMENTS

| | | | |
|---|---|---|---|
| 2,895,374 | 7/1959 | Price | 350/130 |
| 3,670,097 | 6/1972 | Jones | 358/91 |
| 3,932,702 | 1/1976 | Shelley et al. | 350/170 |
| 4,040,723 | 8/1977 | Groenheweg | |
| 4,167,756 | 9/1979 | Smith | 358/87 |
| 4,288,819 | 9/1981 | Williams | 354/117 |

FOREIGN PATENT DOCUMENTS

| | | |
|---|---|---|
| 463392 | 7/1928 | Fed. Rep. of Germany . |
| 1017654 | 7/1956 | Fed. Rep. of Germany . |
| 327669 | 4/1930 | United Kingdom . |

Primary Examiner—Jon W. Henry
Attorney, Agent, or Firm—Nixon & Vanderhye

[57] ABSTRACT

Lenses (10,11), e.g. for a camera for a video conferencing system, have divergent optical axes and focus real images via prisms (20,21,22,23) on to a focal plane f. A prism (20) in one path introduces an additional reflection to invert the image while that (22) in the other path causes lateral inversion, so that the two images do not suffer either type of inversion relative to one another. The final reflecting surfaces 211,231 abut in the plane f so that the real images are closely juxtaposed.

6 Claims, 3 Drawing Sheets

DISPLAY A  DISPLAY B

CAMERA OPTICS FOR PRODUCING A COMPOSITE IMAGE FROM TWO SCENES

FIELD OF THE INVENTION

The invention relates to an optical system for producing a composite image from two scenes.

BACKGROUND OF THE INVENTION

Our UK Pat. No. 1438293 describes a television system in which two parts of a relatively wide scene—such as six people seated at a conference table—are viewed by separate cameras. The resultant video signals are combined in that the central 50 percent of the active lines of each individual picture form respectively the upper and lower halves of the composite picture. The single combined signal may be displayed in this form or the two halves of the image can be separated and displayed on a pair of monitors mounted side-by-side.

A known arrangement of this type is depicted in FIG. 1 in plan view where first and second cameras 1,2 mounted at the same height have fields of view (which cross, as shown) covering two halves of a table 3 at which are seated six persons 4. The transmitted picture 5 and two-monitor display 6,7, after separation by a separator 8, are illustrated in FIG. 2. This system allows a maximum of a 4-line gap (arrow 9) between the two images.

One problem with such a system is that even with good quality cameras, regularly adjusted, colour drift can occur to a degree which, though not subjectively noticeable on a single picture, is apparent when images from the two cameras are viewed simultaneously.

The present invention aims to provide a composite signal from a single camera, and is defined in the appended claims.

BRIEF DESCRIPTION OF THE DRAWINGS

As noted above.

Figure 3:
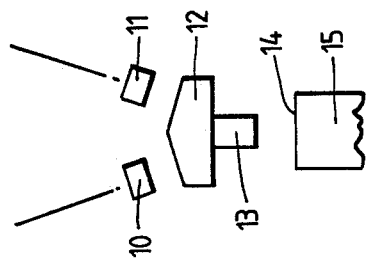
Figure 5:
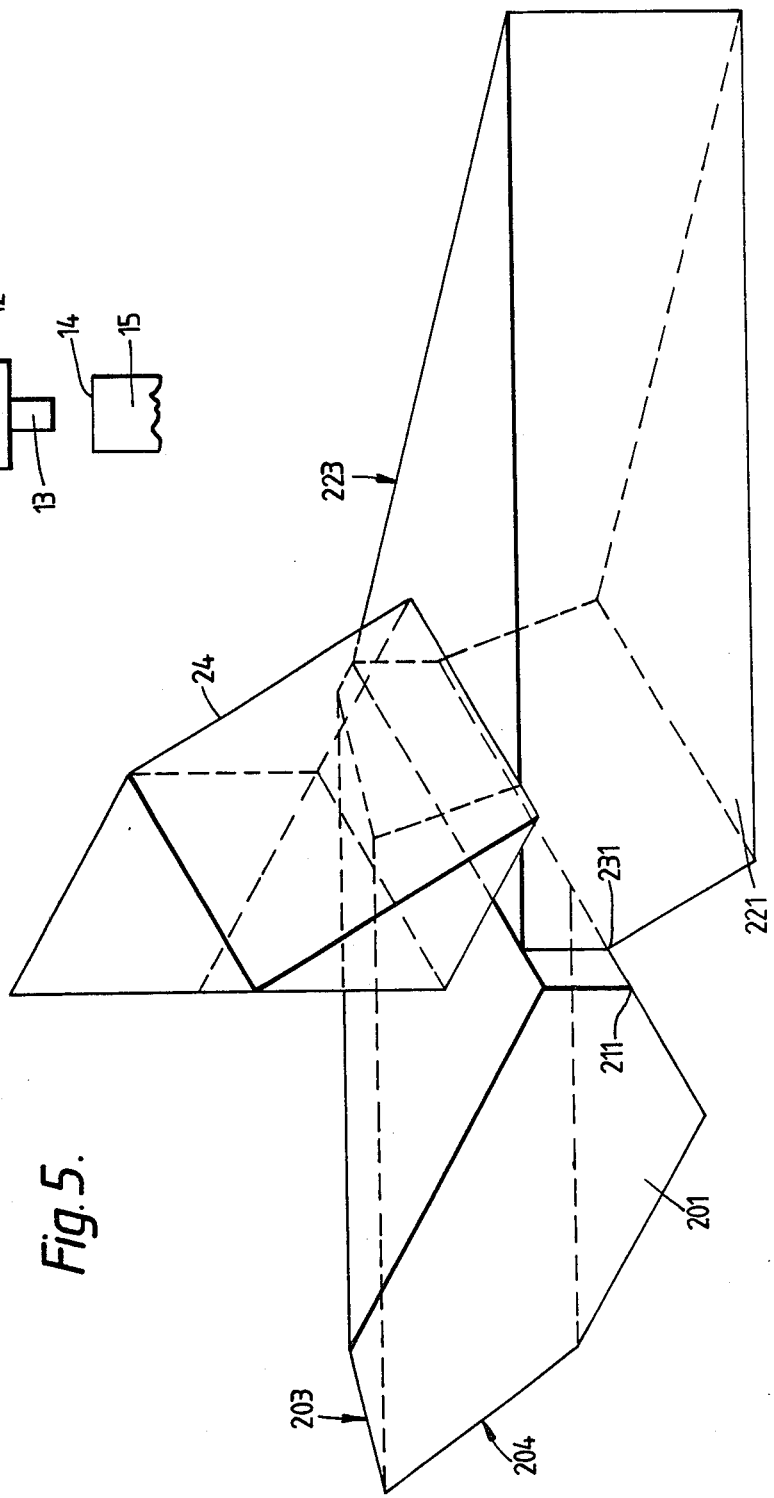
Figure 4:
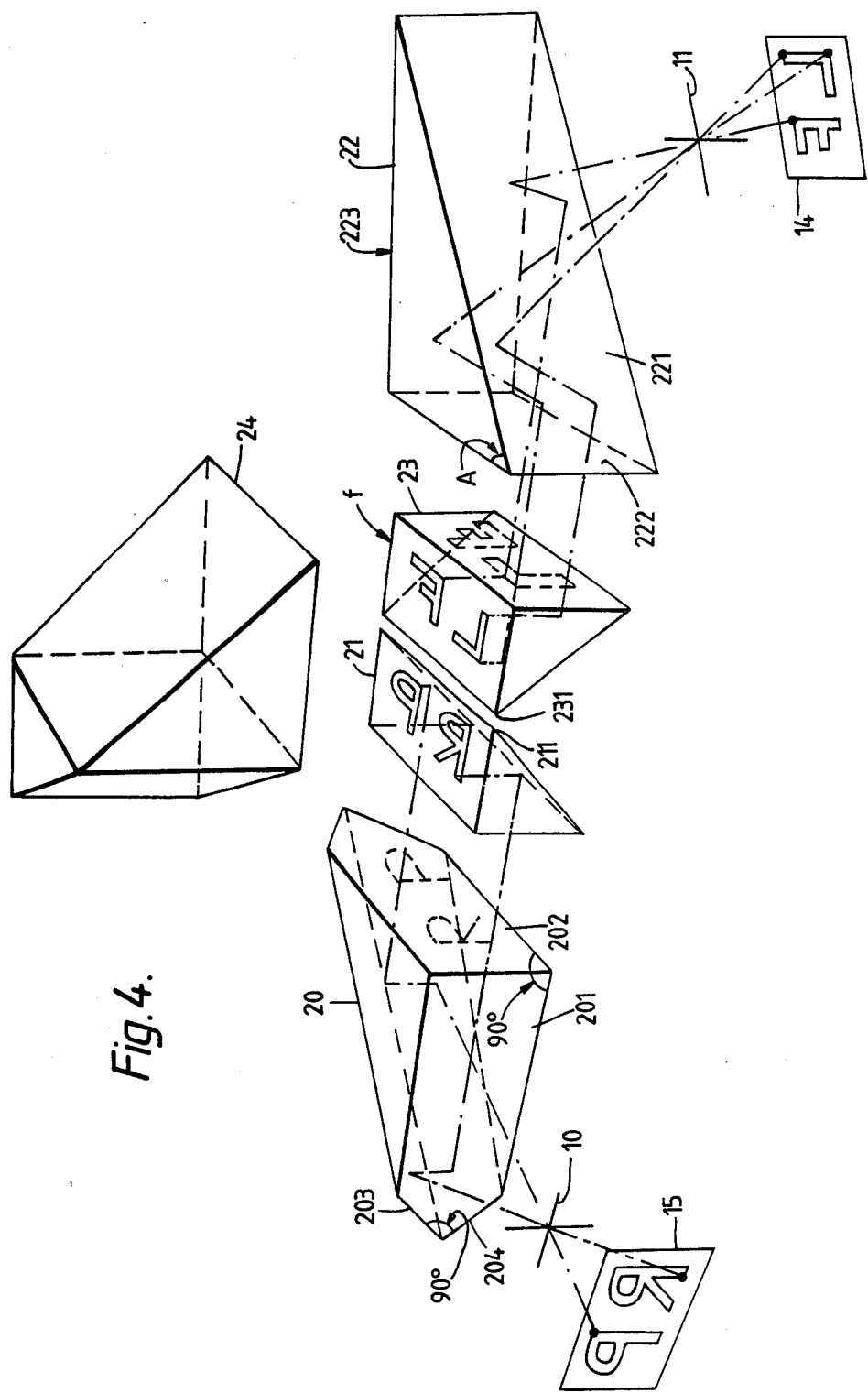

One embodiment of the invention will now be described, by way of example, with reference to the accompanying drawings, in which:

FIG. 3 is a schematic drawing shown the overall arrangement of a television camera incorporating optics according to one embodiment of the invention;

FIG. 4 is an exploded perspective view of the prism arrangement of the camera of FIG. 3; and FIG. 5 is a modified form of the prism arrangement.

DETAILED DESCRIPTION OF THE INVENTION

In FIG. 3 is shown the overall arrangement of a camera when a pair of identical lenses 10,11 whose optical axes lie in a common plane (the axis plane) and are disposed at a suitable angle (eg 41°) to view the two halves of a scene. The axis plane is assumed to be horizontal. The respective images are directed via a prism arrangement 12—which consists entirely of planar reflecting facets—and a relay lens 13 on to the target 14 of a camera tube 15. The remainder of the camera is conventional, as indeed are all the components shown in FIG. 3 with the exception of the prism arrangement 12 which will now be considered in more detail.

FIG. 4 shows left-hand and right-hand scene halves, 14,15 which are assumed for illustration to consist of the letters LF and RP, the lenses 10,11 and an exploded diagram of the prism assembly 12.

Light from the right-hand scene RP passes through the lens and undergoes multiple reflection in a roof prism 20 and thence passes through a 45° prism 21. The focal length and adjustment of the lens 10 are such that the image is brought to a focus on a plane f parallel to the axis plane which (as depicted in FIG. 4) is coincident with the upper surface of the prism 21. Light from the left-hand image LF passes through the lens 11 and is reflected within a prism 22 (the geometry of which is discussed below) and thence by a 45° prism 23. Again the image is brought to a focus in the focal plane f. Thus the two images are brought into juxtaposition on a common focal plane. The images are in positions such that an elongate object placed within the field of view of one lens with its axial normal to the axis plane gives rise to a real image whose axis is colinear with that of a real image from a like object similarly placed within the field of view of the other lens—ie objects which are side by side within the fields of view of the two lenses appear one above the other in the composite real image.

The single real image thus formed is then focussed by the relay lens 13 (not shown in FIG. 4) onto the camera target. A pair 24 of 45° prisms is interposed simply in order to allow the camera tube to the mounted horizontally.

Figure 1:
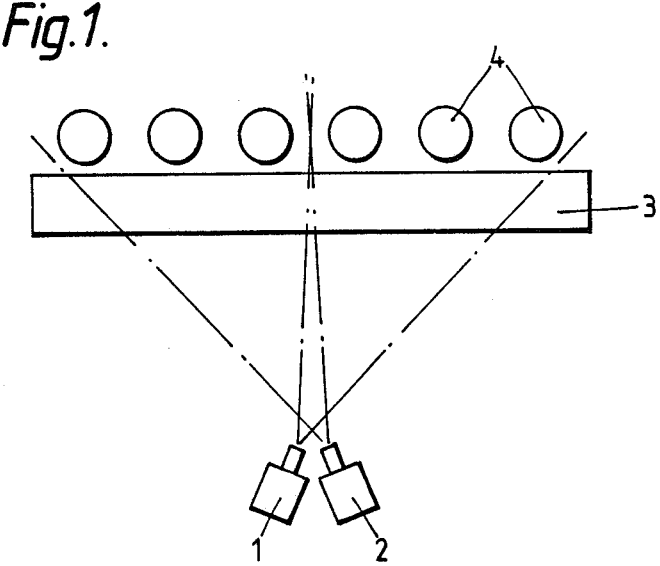
FIG. 1 shows a known system for generating a composite picture with two cameras.
Figure 2:
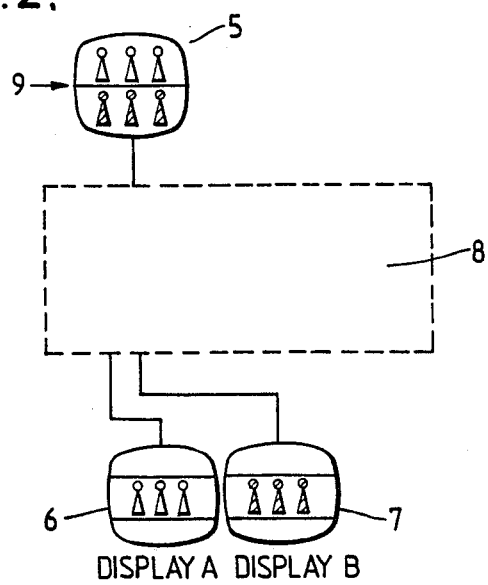
FIG. 2 shows the transmitted picture and two-monitor display generated with the system of FIG. 1.

Consider now the optical requirements of the prism arrangement 12. Inversion or lateral inversion of the composite image is not critical where the camera scan directions can be set to suit the optical system. However, it is clearly necessary that (a) the images from the two lenses must not be inverted or (b) laterally inverted relative to one another and (c) the left-hand image must appear (for the system depicted in FIG. 2) above the right-hand image when the two are combined. If prisms involving single reflection were used for prisms 20,22, these conditions would not be satisfied.

The function of the various components is apparent from FIG. 4 where ray paths are indicated schematically by chain-dot lines. The letters LF,RP are indicated in continuous lines on the focal plane f but elsewhere are shown in dotted lines (merely for clarification) since the images are not in focus at these points.

The prism 20 is a roof prism (a known form of prism) in which the entry face 201 (normal to the optical axis of the lens 10) and exit face 202 are mutually perpendicular, as are the reflecting faces 203,204. This prism introduces a second reflection which inverts the image thereby compensating the inversion due to the 'opposite-hand' arrangement of the two halves of the prism arrangement, and thus satisfies condition (a).

The prism 22 has its entry face 221 normal to the optical axis of the lens 11 whilst its exit face 222 is parallel to the optical axis of the other lens 10 (and also the entry faces of the 45° prisms 21,23 and the exit face of the roof prism 20). Assuming a divergence between the lens axes of 41°, then the angle A shown in the figure is 49°; in order that rays entering at 90° should leave at 90° the angle B (between the entry face 221 and the (first) reflecting face 223) is $(90-41)/2 = 24\frac{1}{2}°$.

The prism 22 introduces a second reflection which introduces a lateral inversion and thus satisfies condition (b). Note that the angle of incidence on the first reflecting face 223 is such that total internal reflection does not occur and this face must be provided with a reflective coating. If the resulting attenuation causes excessive imbalance then a compensating loss can be introduced into the other image path, eg by providing a reflective coating (otherwise unnecessary) on the reflecting face of the prism 21.

Condition (c) is satisfied by placing the prism 22 on the left and the roof prism on the right. This could of course be reversed if it is desired to transpose the image halves.

It will be appreciated that the focussing of the two images on the plane f containing the apices 211,231 of the 45° prisms 21, 23 which are themselves very close together or in contact (the gap visible in FIG. 4 being shown only for clarity) ensures a small gap between the two parts of the composite image and can meet the 4-line limit mentioned above as typical for such systems.

FIG. 5 shows a practical embodiment of the prism arrangement where the 45° prisms 21,23 are extended vertically thereby avoiding the acute angles at the apices 211,231, facilitating accurate juxtaposition of the two prisms and reducing the risk of damage to the apices. Moreover there is no gap between the prisms 20,22 and their respective 45° prisms; in fact each pair is formed integrally from a single glass block. It will be observed too that the rear of the roof prism is cut off parallel to the entry face, since the missing material is not required.

One possible variation in the above geometry to improve correction of optical aberrations will now be considered. As described, each half of the composite image derives from the center of the optical field of view of the corresponding lenses 10,11—ie, rays entering on the lens axis appear in the center of the relevant image half. Consequently, any lens aberrations appear in a 'figure of eight' rather than circular distribution. Adjustment of the geometry to use half of the field of view so that rays close to the optical axes of the two lenses appear centrally in the composite image will make the aberrations appear as from a single lens, and facilitates correction, eg by making the aberrations in the relay lens complementary to those in the objective lenses 10,11. This may be achieved by vertical shifting and/or tilting by a few degrees of the optical axes of the lenses relative to the plane in which they nominally lie, with corresponding adjustment of the prism angles.

We claim:

1. An optical system for a camera, comprising first and second convergent lenses disposed with their optical axes lying substantially in a first plane and at an acute angle to one another; first and second reflector means arranged to so reflect rays from the respective lenses that mutually adjacent real images from the lenses can be focussed in a second plane in positions such that an elongate object placed within the field of view of one lens with its axis normal to the first plane gives rise to a real image whose axis is colinear with that of a real image from a like object similarly placed within the field of view of the other lens; the reflector means being arranged to cause additional reflections such as to introduce an inversion and a lateral inversion into the paths traversed by the two images relative to one another whereby the two real images are neither inverted relative to each other nor laterally inverted relative to each other.

2. An optical system for a camera, comprising first and second convergent lenses disposed with their optical axes lying substantially in a first plane and at an acute angle to one another, first and second reflector means arranged firstly to direct rays from the respective lenses in directions generally parallel and opposite to one another and parallel to the first plane and then to deflect the rays in a direction generally perpendicular to the first plane such that mutually adjacent real images from the lenses can be brought to a focus in a second plane parallel to the first in positions such that an elongate object placed within the field of view of one lens with its axis normal to the first plane gives rise to a real image whose axis is colinear with that of a real image from a like object similarly placed within the field of view of the other lens; the first reflector means being arranged to cause an additional reflection such as to effect an inversion of the associated image, and the second reflector means being arranged to cause an additional reflection such as to effect a lateral inversion of the associated image, whereby the two real images are neither inverted relative to each other nor laterally inverted relative to each other.

3. An optical system according to claim 2 in which the first reflector means comprises a roof prism and the second comprises a triangular prism having two reflecting faces.

4. An optical system according to claim 2 or 3 in which each reflecting means also comprises a 45° reflecting surface at 45° to the first plane and at right angles to the other such surface, for effecting the said deflection, the edges of the 45° reflecting surfaces having mutually contiguous edges lying in the second plane such that there is substantially no gap between the two real images.

5. An optical system according to any one of claims 2 or 3 arranged such that rays entering the lenses close to their optical axes appear in the center of the composite real image.

6. An optical system according to any one of claims 1-3, wherein said camera is a television camera and further including a relay lens for focussing the real images upon a pickup device of the camera.

* * * * *